(12) United States Patent
Okazaki et al.

(10) Patent No.: US 6,459,063 B1
(45) Date of Patent: Oct. 1, 2002

(54) APPARATUS FOR ELECTRODISCHARGE MACHINING

(75) Inventors: Shuji Okazaki, Fukui (JP); Yoshio Nakashima, Fukui (JP); Kenji Yamada, Fukui (JP); Sadao Sano, Kanagawa (JP)

(73) Assignees: Sodick Co., Ltd., Kanagawa (JP); KHS Co., Ltd., Kanagawa (JP)

( * ) Notice: Subject to any disclaimer, the term of this patent is extended or adjusted under 35 U.S.C. 154(b) by 0 days.

(21) Appl. No.: 09/786,116

(22) PCT Filed: Jul. 10, 2000

(86) PCT No.: PCT/JP00/04566

§ 371 (c)(1), (2), (4) Date: Mar. 1, 2001

(87) PCT Pub. No.: WO01/03871

PCT Pub. Date: Jan. 18, 2001

(30) Foreign Application Priority Data

Jul. 8, 1999 (JP) ............................................. 11-194234

(51) Int. Cl.[7] ................................................. B23H 7/30
(52) U.S. Cl. ..................................................... 219/69.2
(58) Field of Search ........................... 219/69.15, 69.14, 219/69.17, 69.2

(56) References Cited

U.S. PATENT DOCUMENTS

| | | | |
|---|---|---|---|
| 3,725,631 A | * | 4/1973 | Angelucci et al. ......... 219/69.2 |
| 3,786,223 A | * | 1/1974 | O'Connor ................... 219/69.2 |
| 4,319,115 A | | 3/1982 | Bonga ...................... 219/69.15 |
| 5,444,204 A | | 8/1995 | Derighetti et al. ....... 219/69.15 |
| 6,310,313 B1 | * | 10/2001 | Akune et al. .............. 219/69.2 |

FOREIGN PATENT DOCUMENTS

| | | | |
|---|---|---|---|
| JP | 50-32337 | | 9/1975 |
| JP | 62-2928 | | 1/1987 |
| JP | 5-104332 A | * | 4/1993 |
| JP | 2000-190131 | | 7/2000 |
| JP | 2000-225526 | | 8/2000 |

* cited by examiner

*Primary Examiner*—Geoffrey S. Evans
(74) *Attorney, Agent, or Firm*—McDermott, Will & Emery; Paul Devinsky

(57) ABSTRACT

An electric discharge machining apparatus includes a first movable body (40, 42, 50) movable along the Z axis, a ball screw (34), a motor (30) for causing rotation of the ball screw, a nut (35), attached to the first movable body, threadingly engaging the ball screw, a second movable body (10, 13) movable along the Z axis relative to the first movable body, capable of having the tool electrode attached thereto, and a linear motor (71, 72, 73) for moving the second movable body, for machining a workpiece by moving a tool electrode along a Z axis towards the workpiece while causing an electric discharge between the workpiece and the tool electrode. The linear motor includes a stator (73) attached to the first movable body, and a mover (71, 72) attached to the second movable body. The first and second movable bodies include respective electrode attachment units (50, 13).

6 Claims, 4 Drawing Sheets

APPARATUS FOR ELECTRODISCHARGE MACHINING

FIELD OF THE INVENTION

The present invention relates to an electric discharge machine for making holes of various shapes in a workpiece by advancing a tool electrode towards the workpiece while causing an electric discharge between the tool electrode and the workpiece.

BACKGROUND OF THE INVENTION

Electric discharge machines are widely used to accurately machine solid conductive workpieces into molds of various shapes. The workpiece is normally placed in a work. tank and fixed to a table movable in the horizontal plane. The tool electrode is attached to a lower end of a quill movable in the vertical direction using a suitable electrode holder. The tool electrode is manufactured from a material that is easy to cut, such as, for example, copper or graphite. In preparation for machining the workpiece, the work tank is filled with dielectric fluid such as kerosene, and the tool electrode is positioned extremely close to the workpiece. A space between the tool electrode and the workpiece is called a gap, and size of this gap is controlled to be between a few $\mu$m to a few tens of $\mu$m. If a power pulse is applied between the tool electrode and the workpiece during the ON-time, the insulating characteristics of the dielectric fluid in the gap break down and an electric discharge occurs. The material of the workpiece evaporates or melts as a result of the heat from the electric discharge and becomes entrained in the dielectric fluid. Upon completion of the ON-time, application of the power pulse is suspended during the OFF-time and the insulating properties of dielectric fluid in the gap are restored. Electric discharge machines ordinarily repeatedly apply the power pulse to the gap with the ON-time and the OFF-time controlled between 1 $\mu$sec to several tens of msec. As the gap is maintained at a constant size, the tool electrode is gradually moved downwards towards the workpiece in accordance with removal of the workpiece material. In a coordinate system for positioning the tool electrode relative to the workpiece, a line representing an amount of linear movement of the tool electrode towards the workpiece is called the Z axis from a control viewpoint. In many electric discharge machines, the Z axis number normally represents a position of the tool electrode in the vertical direction. Since the electric discharge machine removes a microscopic amount of material from the workpiece at a time without the tool electrode actually coming into contact with the workpiece, a cavity having a desired surface roughness is formed in the workpiece with good accuracy. The cavity is complementary in size and shape to the tool electrode, which means that various tool electrodes are used according to the shape of the cavity required. In order to make a large cavity, a large tool electrode becomes necessary, and electric discharge machines capable of holding a tool electrode in excess of 100 Kg on the quill are known.

A flushing operation for producing a flow of dielectric fluid through the gap is necessary in order to rinse fragments that have been removed from the workpiece from the gap. The flushing operation prevents undesirable secondary discharge between the tool electrode and fragments that have been removed from the workpiece, and contributes to restoration of the insulating properties of the dielectric fluid during the OFF-time. In preparation for machining of the workpiece, a skilled operator will make holes for introducing fresh dielectric fluid into the gap and suctioning used dielectric fluid from the gap in the tool electrode and the workpiece. Flushing is the key to faster and better precision electric discharge machining, but skill and experience are required in order to produce uniform flow across the entire gap according to the shape of a required cavity. Depending on the situation, it may not be desirable to form flushing holes in the workpiece, or there might be restrictions in forming those types of holes in the tool electrode. For example, in the case where an operator is making a deep cavity having an elongated opening in a workpiece, a thin rib-shaped tool electrode is used. Because it is difficult to form flushing holes in such a tool electrode, an injection system is normally used to inject dielectric fluid from the side of the tool electrode towards the gap. However, an injection system can not sufficiently remove contaminated dielectric fluid from the gap as the cavity being formed in the workpiece becomes deeper. An operation known as a "jump" is known for compensating for this insufficient flushing operation. The jump operation involves periodically raising and then lowering the tool electrode rapidly in the Z axis direction, and drives out almost all of the contaminated dielectric fluid from the cavity in the workpiece. Conventionally, the tool electrode moves at a speed of several hundred mm/min during the jump operation. If the reciprocating distance of the tool electrode is large, more fresh dielectric fluid flows in to the gap, and more contaminated fluid is removed from the gap. The tool electrode is preferably raised up by at least the depth of the cavity being machined in the workpiece. However, since no material is removed from the workpiece during the jump operation, performing the jump operation too frequently will adversely lower the stock removal rate. In order to carry out a jump operation with a large amount of movement that does not cause a lowering of the stock removal rate, the tool electrode is preferably made to move at high speed and with an acceleration and deceleration in excess of 1 G.

SUMMARY OF THE INVENTION

An object of the present invention is to provide an electric discharge machining apparatus that can effectively wash fragments removed from a workpiece away from a gap without causing a reduction in stock removal rate, even when machining a deep cavity using a thin tool electrode.

Another object of the present invention is to provide an electric discharge machine that is as compact as possible.

Additional objects of the invention will be set forth in the description that follows, and will become apparent to those skilled in the art upon practicing the invention.

In order to achieve the above and other objects, an electric discharge machining apparatus according to one aspect of the present invention for machining a workpiece by moving a tool electrode along a Z axis towards the workpiece while causing an electric discharge between the workpiece and the tool electrode comprises:

a first movable body movable along the Z axis;

a ball screw;

a motor for causing rotation of the ball screw;

a nut, attached to the first movable body, threadingly engaging the ball screw;

a second movable body movable along the Z axis relative to the first movable body, capable of having the tool electrode attached thereto; and a linear motor for moving the second movable body.

The linear motor preferably comprises a stator attached to the first movable body, and a mover attached to the second movable body.

The first movable body preferably comprises an electrode holder to which the tool electrode can be attached.

The second movable body is preferably provided coaxially with the first movable body.

In accordance with another aspect of the invention, an electric discharge machining apparatus of the present invention for machining a workpiece by moving a tool electrode along a Z axis towards the workpiece while causing an electric discharge between the workpiece and the tool electrode comprises:

a first movable body movable along the Z axis and having a first electrode holder to which the tool electrode can be attached;

a ball screw;

a motor for causing rotation of the ball screw;

a nut, attached to the first movable body, threadingly engaging the ball screw;

a second movable body movable along the Z axis relative to the first movable body, and having a second electrode holder to which the tool electrode can attached; and a linear motor for moving the second movable body.

Accordingly, the tool electrode can be selectively attached to one of the first and second electrode holders. A detector is preferably provided for detecting selection of the electrode holder.

DESCRIPTION OF PRESENTLY PREFERRED EMBODIMENTS OF THE INVENTION

Exemplary embodiments of an electric discharge machining apparatus according to the present invention will now be described with reference to FIGS. 1, 2, 3, 4, 5, 6 and 7.

Figure 1:
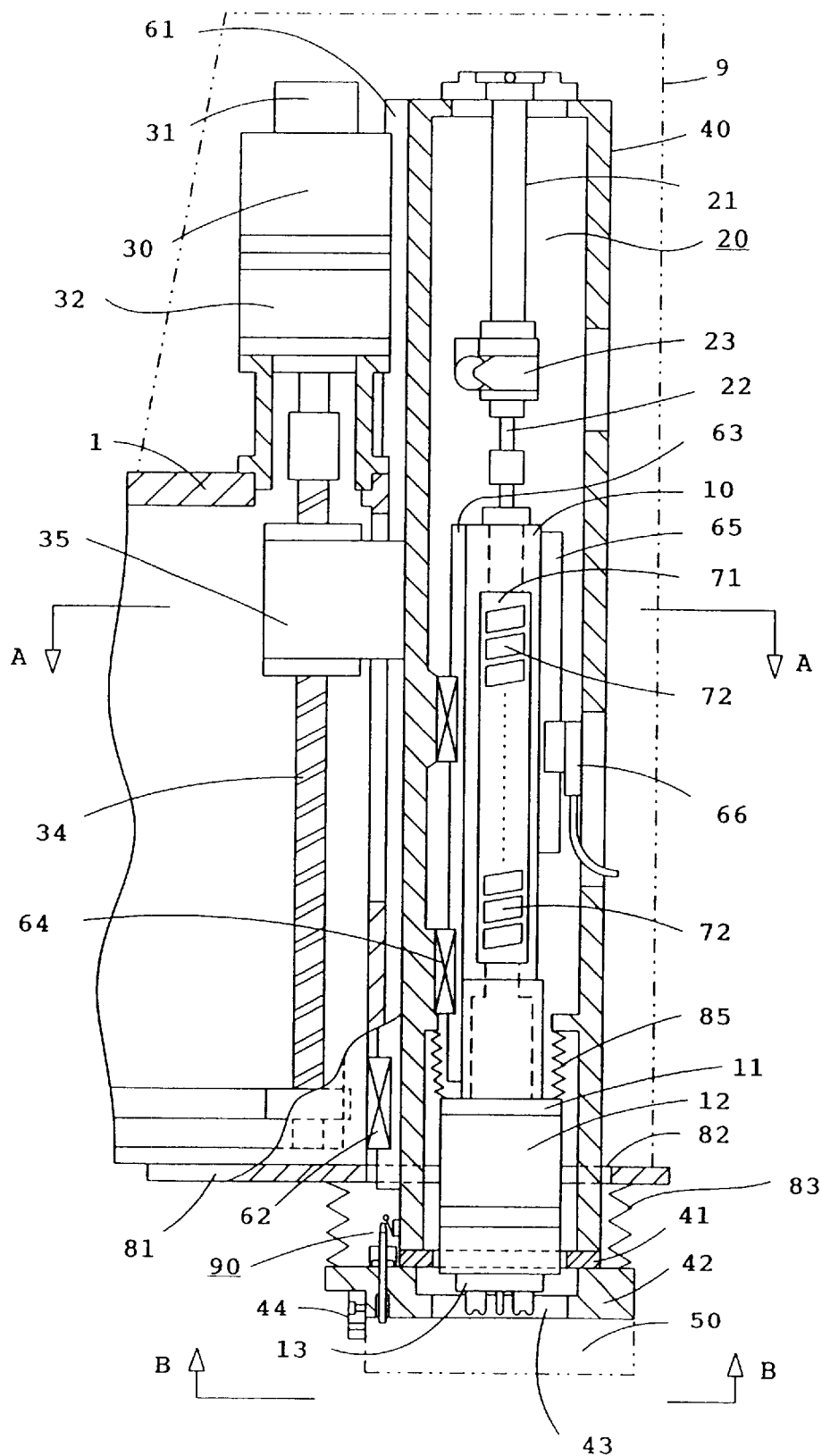
FIG. 1 is a cross sectional side elevation illustrating an embodiment of an electric discharge machining apparatus of the present invention.

As illustrated in FIG. 1, an ac servo motor 30 provided with a rotary encoder 31 and a brake 32 is fixed to a column 1. A ball screw 34 extending in a vertical direction is rotated by the servo motor 30. A ball screw nut 35 which threadingly engages the ball screw 34 is attached to a frame 40. The frame 40 is a main part of a body movable in the Z axis direction. A tool electrode or a tool holder may be attached to the movable body. In the illustrated embodiment the frame 40 has a square cross section and extends in the vertical direction. A pair of linear motion bearing rails 61 for guiding the frame 40 movable in the Z axis direction are attached to the frame 40 so as to be opposed with respect to the ball screw nut 35.

Figure 5:
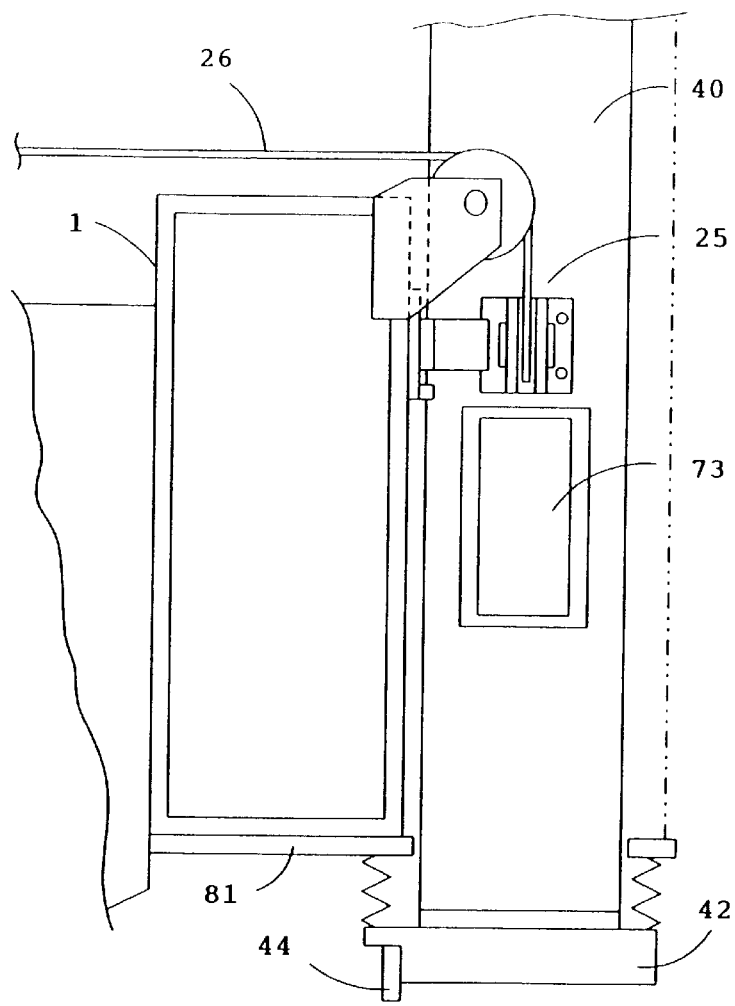
FIG. 5 is a side elevation of the electric discharge machining apparatus of FIG. 1.

Upper and lower linear motion bearing blocks 62 attached to the column 1 are fitted into the respective rails 61. The rotary encoder 31 feeds back a signal representing the position of the frame 40 on the Z axis to an NC device (not shown). The NC device supplies a movement command signal to a drive unit of the servo motor 30. The frame 40 as illustrated in FIGS. 1, 2 and 5 is positioned at the upper limit of the Z axis.

Figure 2:
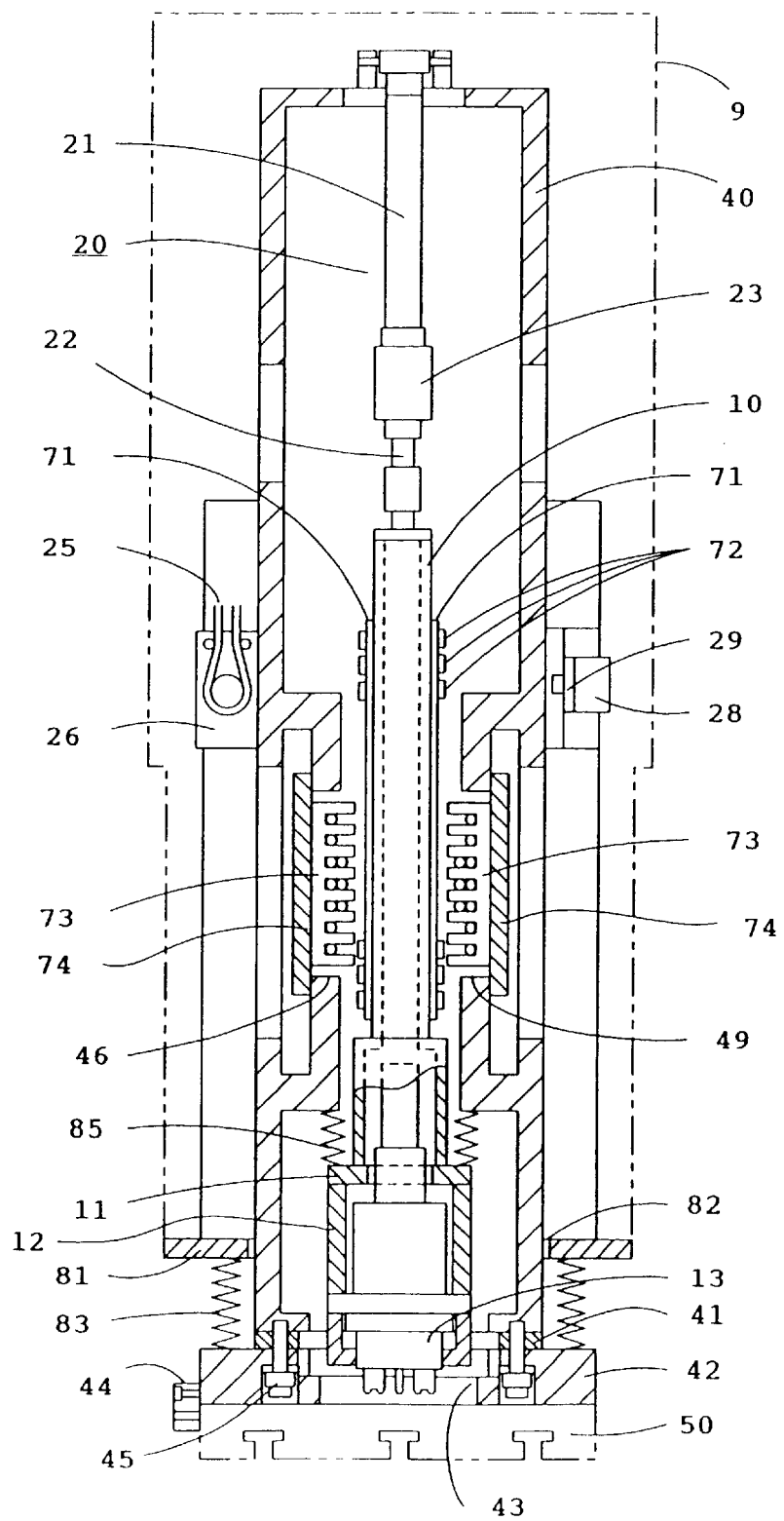
FIG. 2 is a vertical cross section, viewed from the front, of the electric discharge machining apparatus of FIG. 1.

As illustrated in FIG. 2, a plate 42 is attached to the lower end of the frame 40 by a number of bolts 45. A suitable electrode attachment unit 50 is detachably attached to the plate 42.

Figure 6:
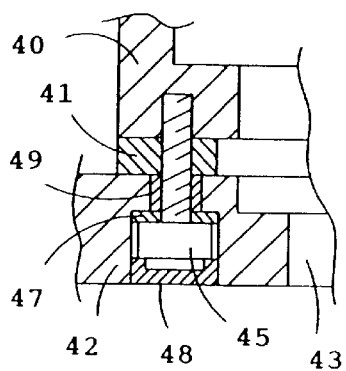
FIG. 6 is a cross section showing an enlarged view of a lower end of a frame of the electric discharge machining apparatus of FIG. 1.

As shown most clearly in FIG. 6, an insulating plate 41 is provided between the frame 40 and the plate 42 and insulating bushes 49 and insulating washers 47 are provided between the plate 42 and the bolts 45. Holes for insertion of the bolts 45 are formed in the plate 42, and blocked off by insulating covers 48.

Figure 4:
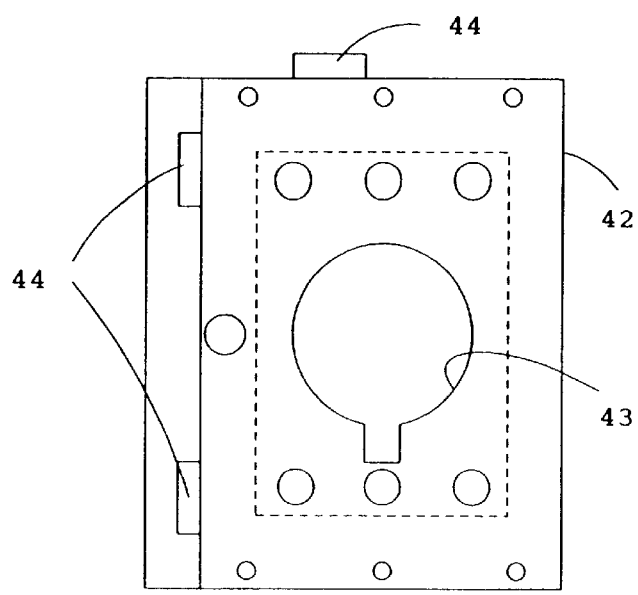
FIG. 4 is a bottom view of the electric discharge machining apparatus of FIG. 1 viewed along line B—B.

As shown most clearly in FIG. 4, the plate 42 has an opening 43, and a number of blocks 44 for accurately attaching the electrode attachment unit 50 to the plate 42 are attached to the plate 42.

Figure 3:
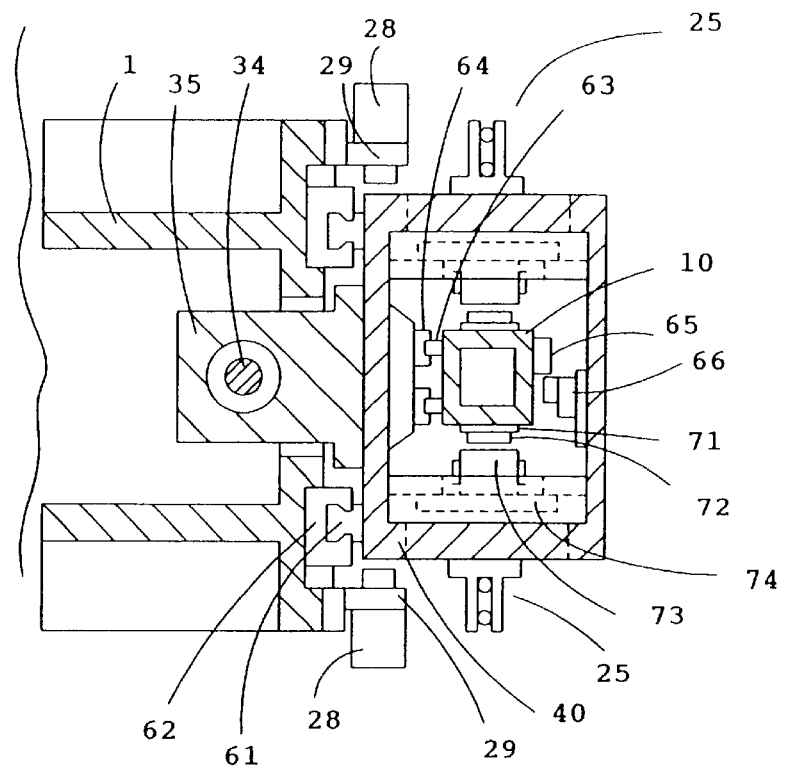
FIG. 3 is a horizontal cross section of the electric discharge machining apparatus of FIG. 1 viewed along line A—A.

As best illustrated in FIG. 2, T slots are formed in the electrode attachment unit 50 so that a large tool electrode or tool holder can be attached to the electrode attachment unit 50. A cable for transmitting power to the tool electrode is connected from a power source, through a terminal box (not shown) provided on the column 1, to the electrode attachment unit 50. A plate 81 extends horizontally from the column 1, and an opening 82 through which the body movable in the Z axis passes is formed in the plate 81. A bellows 83 for dust protection is provided between the plate 81 and the plate 42. A cover 9 surrounding the servo motor 30 and the frame 40 is attached to the column 1 and the plate 81. A workpiece is fixed on a table (not shown) moveable in the orthogonal X axis and Y axis directions which are vertical to the Z axis. A weight (not shown) for balancing a gravitational force acting on the frame 40 is provided behind the column 1. As shown in FIG. 5, this weight is connected to hangers 25 respectively attached to both sides of the frame 40, using wire 26. As illustrated in FIG. 3, air cylinder units 28 are attached to respective brackets 29 fixed to the column 1. The air cylinder units 28 can fix the frame 40 to the column 1 by pressing piston rods against the frame 40.

A hollow quill 10 is arranged inside the frame 40. This quill 10 is a main part of a movable body movable in another Z axis direction relative to the frame 40. A tool electrode or tool holder can be attached to the movable body. The amounts of travel of the two parallel Z axes will probably be different, but the two Z axes preferably overlap. The quill 10 has a square cross section and extends vertically coaxially with the frame 40. A pair of linear motion bearing rails 63 for guiding the quill movable in another Z axis direction are attached to the quill 10. Upper and lower linear motion bearing blocks 64 attached to the inner surface of the frame 40 are fitted into respective rails 63. A cylindrical spacer 12 is attached to a lower end of the quill 10 so as to hold a disk-shaped insulating plate 11 between the quill 10 and the spacer 12. An electrode attachment unit 13 having a chuck for holding a small tool electrode or electrode holder is fixed to the spacer 12 coaxially with the quill 10.

A cable for transmitting power to the tool electrode is connected from a power source, through a terminal box (not shown) provided on the column 1, to the electrode attachment unit 13. The power source is selectively connected to one of the electrode attachment units 13 and 50 using switches inside the terminal box. The electrode attachment unit 13 comprises a servo motor for rotating the tool electrode centrally around another Z axis, and a rotary encoder having high resolution and being capable of indexing the rotation angle of the tool electrode.

In order to perform a jump operation with a large amount of movement without lowering the stock removal rate, the body movable in another Z axis is capable of moving with high acceleration through the opening 43 in the plate 42 using two linear motors. The stators of the linear motors comprise a magnetic plate 71 affixed to the side surface of the quill 10, and a plurality of permanent magnets 72 arranged in a row on the magnetic plate 71. Each of the permanent magnets 72 is inclined slightly from the horizontal direction in order to reduce torque ripple. The movers of the linear motors comprise an electromagnet 73 made up of a coil and a yoke. Respective structural elements of the two linear motors are arranged symmetrically about the central axis of the quill 10. If current flows in coils of the electromagnets 73, the quill 10 moves in a vertical direction due to thrust generated between the stators and the movers.

As clearly shown in FIG. 2, two electromagnets 73 are attached to plates 74 maintaining size of the gap between electromagnets 73 and opposing permanent magnets 72 at the same small value. The plates 74 are vertically fixed in windows 46 formed in the quill 10. An air cylinder unit 20 is provided for generating a balance force to counteract the gravitational force acting on the quill 10. A cylinder 21 of the air cylinder unit 20 is provided coaxially with the quill 10. An upper end of the cylinder 21 is fixed to the frame 40, and a locking device 23 is provided on a lower end of the cylinder 21. One end of a piston rod 22 is linked to a piston (not shown) sliding on an inner wall of the cylinder 21, and the other end of the piston rod 22 is linked to an upper end of the quill 10 by a suitable coupling. The pressure of air supplied to the cylinder 21 is adjustable depending on the weight of the tool electrode etc. The air cylinder unit 20 can follow movement of the quill 10 with an acceleration in excess of 1 G with higher responsiveness than a balancing weight. The air cylinder unit 20 includes a locking device 23 through which the piston rod 22 passes. The locking device 23 prevents unexpected dropping of the tool electrode at the time of electricity failure by gripping the piston rod 22. In addition, when movement of the quill 10 in the Z axis direction is necessary, the locking device 23 fixes the quill 10 to the frame 40. A linear scale 65 is fixed to one of the four sides of the quill 10 that does not have a linear motor mover fixed thereto. A sensor 66 for reading out a position of the quill 10 on another Z axis is provided on an inner surface of the frame 40. The sensor 66 feeds back a signal representing the position of the quill 10 on another Z axis to an NC device, and the NC device supplies a position command signal to a drive unit of the linear motor. The drive unit supplies a current signal to coils of the electromagnets 73.

One of the two electrode attachment units 50 and 13 is used depending on the shape of the tool electrode. When a deep cavity is to be machined using a thin tool electrode, the electrode attachment unit 13 is used. It goes without saying that when an effective flushing operation can not be expected, a high acceleration jump operation using the linear motor is of significant assistance to the insufficient flushing operation. Alternatively, fragments that have been removed from the workpiece can be effectively washed away from the gap by using a high acceleration jump operation instead of the relatively insufficient flushing operation. In cases other than this, the electrode attachment unit 50 is used. Thus, since it is not expected that a large heavy tool electrode will be attached to the electrode attachment unit 13, there is no need for the linear motor to generate an excessively large thrust and the efficiency of the linear motor is not reduced due to over heating. In order to sufficiently exhibit the high acceleration and high speed performance of the linear motor, another Z axis movable body comprising the quill 10 and the electrode attachment unit 13 is preferably made as lightweight as possible. An operator can select one of the two Z axes using an input device of the NC device. With the illustrated embodiment, the NC device can recognize a selected Z axis using a signal from the electrode detection unit 90.

Figure 7:
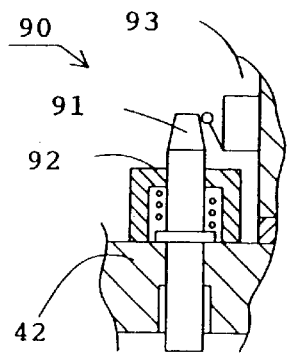
FIG. 7 is a cross section showing the electrode detection unit of the electric discharge machining apparatus of FIG. 1.

As shown in FIG. 7, the electrode detection unit 90 comprises a pin 91 having a lower end protruding from a lower surface of the plate 42, a spring 92 for pressing the pin 91 downwards, and a limit switch 93 opposite to the upper end of the pin 91. If the electrode attachment unit 50 is attached to the plate 42, the pin 91 engages the spring 92 and presses an actuator of the limit switch 93. If the limit switch 93 sends a signal indicating use of the electrode attachment unit 50 to the NC device, the NC device controls switches inside the terminal box to connect the power source to the electrode attachment unit 50. The NC device also controls the locking device 23 to fix the quill 10 to the frame 40. If a signal indicating use of the electrode attachment unit 13 is transmitted from the limit switch 93 to the NC device, the power source is connected to the electrode attachment unit 13. The NC device also controls the air cylinder unit 28 to fix the frame 40 on the column 1, and operates the brake 32 of the servo motor 30.

The present invention is not intended to be limited to the form disclosed. Various improvements and modifications are clearly possible upon reference to the above description. For example, although two electrode attachment units 50 and 13 are provided, if it is possible to attach tool electrodes of various sizes to the electrode attachment unit 13, the electrode attachment unit 50 can be omitted. However, in cases where it is anticipated that large heavy tool electrodes will also be used, the two electrode attachment units 50 and 13 are preferably provided, as shown in the embodiment, in order to make the electrode attachment unit 13 lightweight.

The illustrated embodiment has been selected in order to describe the essence and practical application of the present invention. The scope of the invention is defined by the attached claims.

What is claimed is:

1. An electric discharge machining apparatus for machining a workpiece by moving a tool electrode along a Z axis towards the workpiece while causing an electric discharge between the workpiece and the tool electrode, comprising:
   a first body movable along the Z axis;
   a ball screw;
   a motor for rotating the ball screw;
   a nut, attached to the first body for threadingly engaging the ball screw;
   a second body, movable along the Z axis relative to the first movable body, adapted to accept a tool electrode; and
   a linear motor for moving the second body.

2. The electric discharge machining apparatus of claim 1, wherein the linear motor comprises a stator attached to the first body.

3. The electric discharge machining apparatus of claim 1, wherein the second body is positioned coaxially with the first body.

4. An electric discharge machining apparatus for machining a workpiece by moving a tool electrode along a Z axis towards the workpiece while causing an electric discharge between the workpiece and the tool electrode, comprising:

a first body move along the Z axis;

a ball screw;

a motor for rotating the ball screw;

a nut, attached to the first body for threadingly engaging the ball screw;

a second body, movable along the Z axis relative to the first body, adapted to accept a tool electrode; and a linear motor, comprising a stator attached to the first body and a mover attached to the second body, for moving the second body.

5. An electric discharge machining apparatus for machining a workpiece by moving a tool electrode along a Z axis towards the workpiece while causing an electric discharge between the workpiece and the tool electrode, comprising:

a first body movable along the Z axis and having a first electrode holder adapted to accept the tool electrode;

a ball screw;

a motor for rotating the ball screw;

a nut, attached to the first movable body for threadingly engaging the ball screw;

a second body, movable along the Z axis relative to the first movable body, and having a second electrode holder adapted to accept a tool electrode; and a linear motor for moving the second body.

6. The electric discharge machining apparatus of claim 5, wherein the first electrode holder includes a detector for detecting attachment of the first electrode holder to the first body.

* * * * *